United States Patent [19]

Takahashi

[11] Patent Number: 5,153,571
[45] Date of Patent: Oct. 6, 1992

[54] PULSE NUMBER CONVERTING SYSTEM FOR INPUT UNIT OF COMPUTER

[75] Inventor: Toshiyuki Takahashi, Shinjuku, Japan

[73] Assignee: Spital Sangyo Co., Ltd., Tokyo, Japan

[21] Appl. No.: 500,308

[22] Filed: Mar. 28, 1990

[30] Foreign Application Priority Data

Mar. 31, 1989 [JP] Japan ................. 1-78492

[51] Int. Cl.⁵ .............................. G09G 3/02
[52] U.S. Cl. .......................... 340/710; 340/706; 340/709
[58] Field of Search ............ 340/706, 709, 710, 711; 178/18, 19

[56] References Cited

U.S. PATENT DOCUMENTS

| | | | |
|---|---|---|---|
| 4,552,360 | 11/1985 | Bromley et al. | 340/709 |
| 4,698,629 | 10/1987 | Sato et al. | 340/706 |
| 4,779,079 | 10/1988 | Hauck | 340/706 |
| 4,870,389 | 9/1989 | Ishiwata et al. | 340/706 |

FOREIGN PATENT DOCUMENTS 0153538  8/1985  Japan ................. 340/710

Primary Examiner—Alvin E. Oberley
Assistant Examiner—Chanh Nguyen
Attorney, Agent, or Firm—Kanesaka and Takeuchi

[57] ABSTRACT

An input unit disposed between a mouse and a computer, the mouse being adapted to output a predetermined count number of pulse signals according to an amount of movement of the mouse. This output unit includes a count number converting device for gradually varying the count number of pulse signals outputted from the mouse and for outputting the varied count number to the computer. Preferably the count number converting device should be built in the mouse.

4 Claims, 5 Drawing Sheets

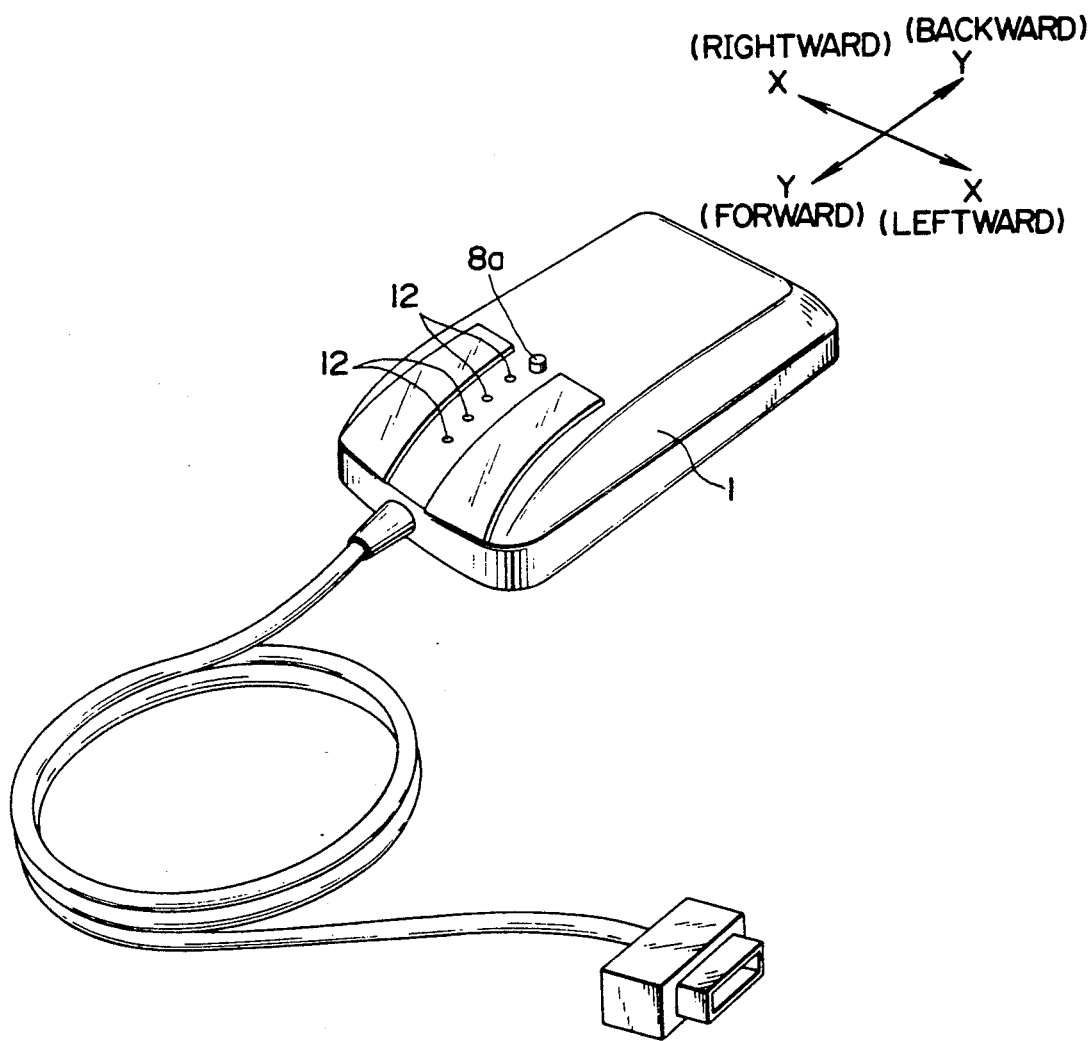

PULSE NUMBER CONVERTING SYSTEM FOR INPUT UNIT OF COMPUTER

BACKGROUND OF THE INVENTION

1. Field of the Invention:

This invention relates to a computer, and more particularly to an input unit, such as a mouse, adapted to be connected to a computer or a keyboard, for generating a predetermined pulse signal.

2. Description of the Related Art:

Heretofore, a mouse is well known as an input unit for generating a pulse signal, to execute a desired command, to a computer by the operator's operation from outside, for example.

In use, the mouse is connected to the computer or a keyboard for outputting a predetermined count number of pulse signals according to an amount of movement of the mouse in four directions therearound. In this kind of mouse, the count number of pulses per inch and speed are predetermined, i.e., 100 to 200 pulses are generated with respect to the movement of 15 to 30 cm in ordinary use.

This kind of mouse is used in setting procedure items on the display screen and graphic display, for example. Specifically, in setting a procedure item, the mouse body is moved to move the cursor to a desired item selected among a plurality of procedure items appeared on the display screen, and then a switch mounted on the mouse is operated while the cursor is in a desired position. In drawing a graphic by dots on the display screen, the operator keeps watching on the screen and moves the mouse body to describe a desired line on the screen.

According to this kind of mouse, some particular procedures can be executed by moving the mouse body while watching the display screen, without using a special keyboard having many operating keys. Therefore it can be operated easily even by any unexperienced operator.

However, with this conventional mouse, if the number of items to be selected is increased or if a graphic to be described is complex, an adequate space is necessary for moving the mouse body with some play, thus increasing a required amount of movement of the mouse body, which creates an excessive labor to be done by the operator and hence lowers the working efficiency.

Consequently, for minimizing the operator's labor and hence improving the working efficiency, the count number of pulses to be outputted from the mouse must be increased to about 400, for example; this is, the amount of movement of the mouse body must be reduced to 4 to 5 cm, which is equivalent to that number.

Yet if the count number of pulses to be outputted from the mouse is so increased, the mouse reacts sensitively for its own slight movement so that the mouse body must be moved slowly to describe a delicate or sophisticated graphic carefully on the display screen, which is laborious and time-consuming. This conventional mouse is therefore not suitable for delicate or sophisticated work.

SUMMARY OF THE INVENTION

It is therefore an object of this invention to provide an input unit, for a computer, in which the count number of pulses can be automatically converted into a plurality of stages according to the type of work to be done by the operator as well as the space for movement of the mouse.

According to this invention, there is provided an input unit to be disposed between a mouse and a computer, the mouse being adapted to output a predetermined count number of pulse signals according to an amount of movement of the mouse, the output unit comprising a count number converting means for gradually varying the count number of pulse signals outputted from the mouse and for outputting the varied count number to the computer.

The above and other advantages, features and additional objects of this invention will be manifest to those versed in the art upon making reference to the following detailed description and the accompanying drawings in which two preferred structural embodiments incorporating the principles of this invention are shown by way of illustrative example.

BRIEF DESCRIPTION OF THE DRAWINGS

FIG. 5 is a perspective view showing the appearance of the input unit of FIG. 4.

DETAILED DESCRIPTION

Figure 1:
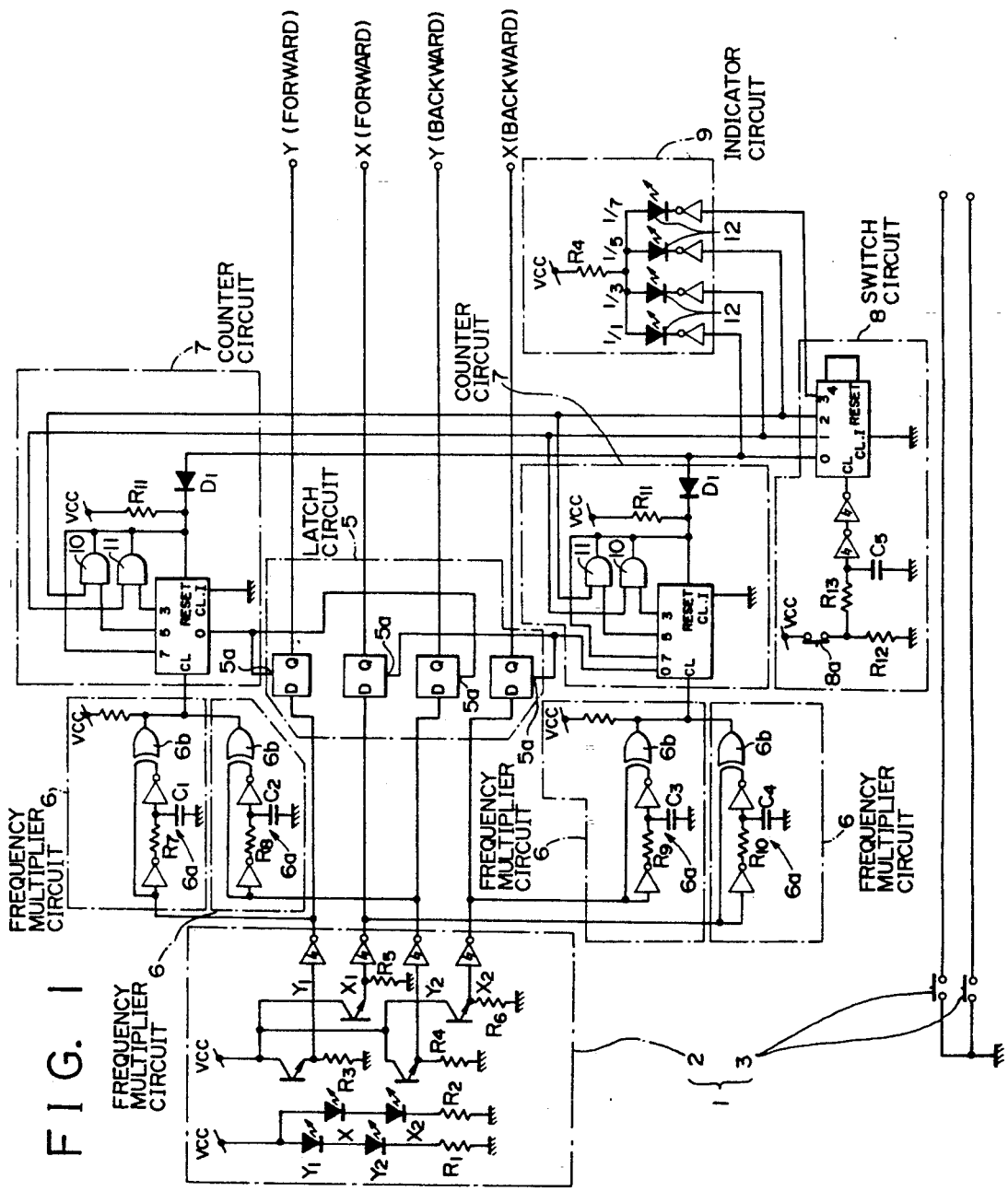
FIG. 1 is a circuit diagram showing an input unit, for a computer, according to one embodiment of this invention, the input unit being connected to a mouse.
Figure 2:
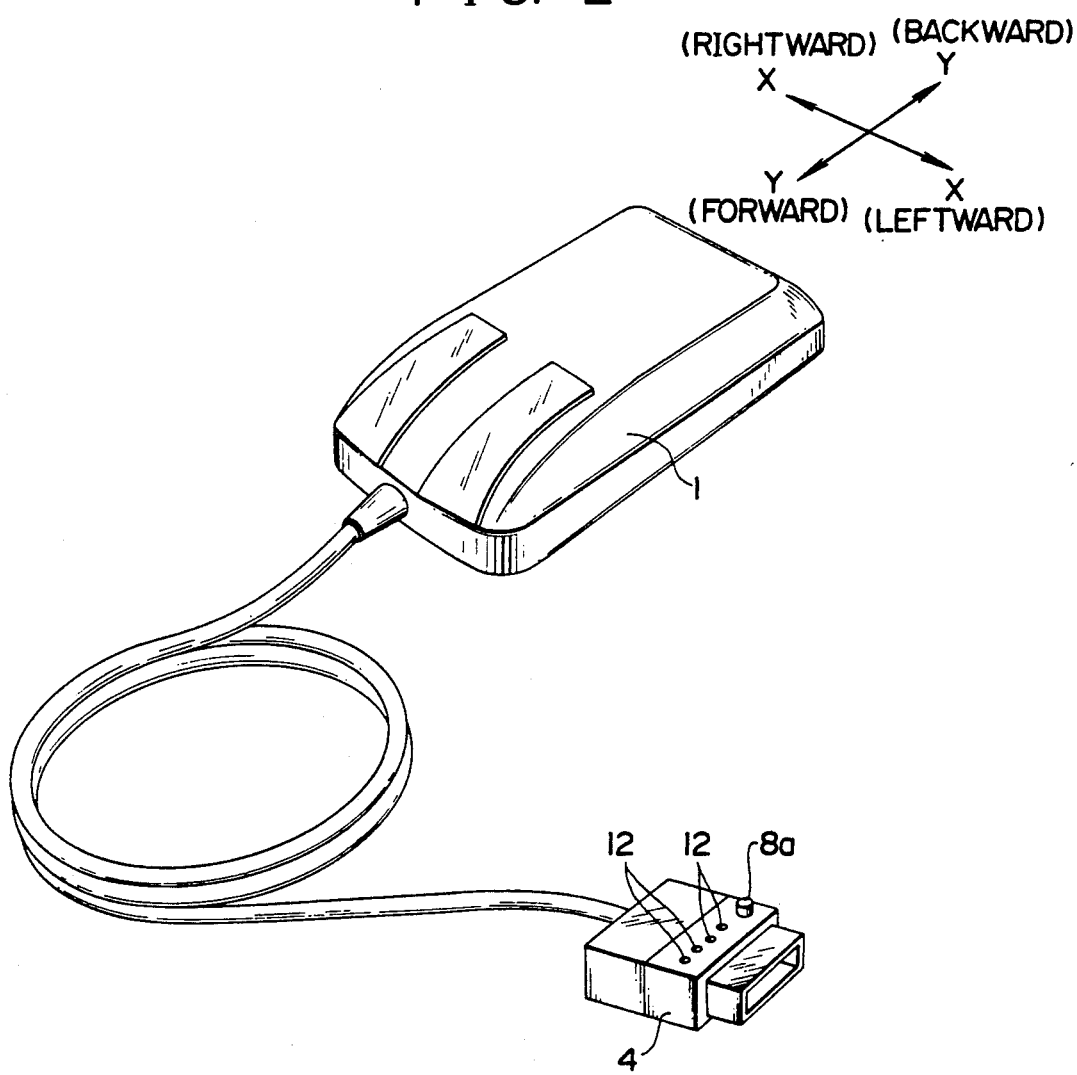
FIG. 2 is a perspective view showing the appearance of the input unit of FIG. 1 and the appearance of the mouse to which the input unit is connected.

The principles of this invention are particularly useful when embodied in an input unit adapted to be connected between a mouse and a computer, the mouse being generally indicated by the numeral in FIGS. 1 and 2.

The mouse 1 is connected to the computer or a keyboard, for example, and is composed of a signal generator circuit 2 and a pair of switches 3, 3. As operated by the operator, the mouse 1 generates a pulse signal for the computer to execute a desired command.

The signal generator circuit 2 generates a pulse signal according to the amount of movement of the mouse body in a forward or backward direction of Y coordinate or in a rightward or leftward direction of X coordinate, as shown in FIG. 2, and outputs the pulse signal to a latch circuit 5 (described below) of the input unit after rectifying the waveform of the pulse signal.

The switch 3, in selecting a desired item from a plurality of procedure items appeared on the display screen such as of a non-illustrated display unit (e.g., CRT), outputs a signal indicative of this item selection to the computer as the operator depresses the switch 3 when the cursor has been moved to the desired item.

The input unit is connected to the mouse 1 in an adaptor fashion and also to the computer via an adaptor 4. The input comprises a latch circuit 5, frequency multiplier circuits 6, counter circuits 7, a switch circuit 8, and an indicator circuit 9.

The latch circuit 5 is disposed in corresponding to four signal lines of the signal generator circuit 2. The latch circuit 5 outputs to the non-illustrated computer, a signal corresponding to the mouse's movement in the respective direction and supplied from the signal generator circuit 2, after converting the signal to a predetermined count number based on a control signal from the individual counter circuit 7 (described below in greater detail). Then the computer discriminates and recognizes the position of the cursor on the screen based on the count number of the pulse signal.

Figure 3:
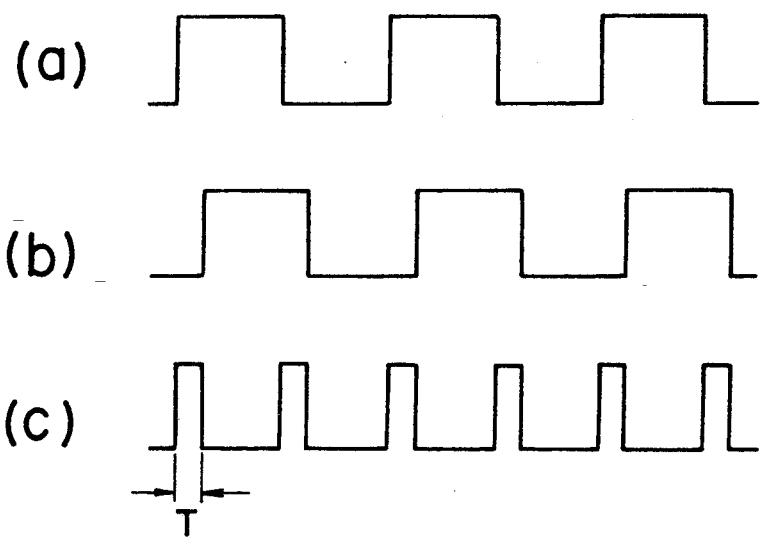
FIGS. 3(*a*) through 3(*c*) are waveform diagrams of various parts of a frequency multiplier circuit in the input unit.

The frequency multiplier circuits 6 are connected to respective output lines of the signal generator circuit 2; the output terminals are divided for X and Y directions of movements, and the output terminal for each direction is connected to a clock terminal (CL) of the corresponding counter circuit 7. Each frequency multiplier circuit 6 includes a delay circuit 6a and an exclusive OR circuit 6a; when a wave of a rectangular waveform of FIG. 3(a) is inputted to the frequency multiplier circuit 6, a signal is supplied to one input terminal of the exclusive OR circuit 6b directly without delay, and another signal is supplied to the other input terminal of the exclusive OR circuit 6b via the delay circuit 6a with a delay of time T, as shown in FIG. 3(b). As a result, only when these two signals are divergent from each other as shown in FIG. 3(c), a further signal is outputted, whereupon this signal is outputted to the control terminal of the counter circuit 7 as it is combined with still another signal by a wired OR circuit.

A single pulse signal outputted at that time corresponds to a single count of movement of the mouse 1.

The individual counter circuit 7 includes an eight-stage counter in which the output of 0 stage is connected to an enable terminal 5a of the respective latch circuit 5. The counter circuit 7 counts pulse signals supplied from the individual frequency multiplier circuit 6 based on a driving signal from the switch circuit 8, and varies the count number of the pulse signals transmitted from the latch circuit 5 to the computer, depending on the presence of a signal to the enable terminal 5a of the latch circuit 5.

More specifically, the outputs of 3-stage and 5-stage are connected to one input terminal of an AND circuit 10 and to one input terminal of another AND circuit 11, respectively, and the other input terminals of the two AND circuits 10, 11 are connected to the corresponding output terminals of the switch circuit 8. The output of each AND 10, 11 is connected to the reset terminal which is pulled up via a resistor $R_{11}$ and connected to the output of 0 stage of the switch circuit 8 via a diode $D_1$. The output of 7 stage of the counter circuit 7 is connected directly to the reset terminal.

The output of the switch circuit 8 is connected to the counter circuit 7, and the outputs of 0 to 3 stages are connected to the respective terminal of the indicator circuit 9. A push-button switch 8a is connected to the clock terminal (CL) of the switch circuit 8. This push-button switch 8a is mounted on the adaptor 4, projecting therefrom; in response to the depression of the push-button switch 8a, driving signals are transmitted from the respective output to the counter circuits 7 and the indicator circuit 9. Further, the driving signal outputted to the counter circuit 7 is used to vary the stage number. With this arrangement, since the conversion can be performed by only a single push button rather than a rotary switch or a slide switch, it is possible to achieve a much more improved operativity.

Specifically, when a high-level signal as the driving signal is outputted from the output of 0 stage of the switch circuit 8, the high-level signal is supplied to the reset terminal of the counter circuit 7 via a diode $D_5$ so that the latch circuit 5 allows 100% (e.g., count number of 400) of pulse signals from the signal generator circuit 2 to pass and outputs them.

Further, when a high-level signal as the driving signal is outputted from the output of 1 stage of the switch circuit 8, the driving signal is supplied to one input terminal of the corresponding AND circuit 10. And when a signal is supplied to the other input terminal of the AND circuit 10, a high-level signal is outputted from the AND circuit 10 to the reset terminal. Namely, in this condition, the counter circuit 7 works as a ternary counter to output to the enable terminal 5a of the latch circuit 5 a control signal whenever three pulses are counted. As a result, pulse signals of a count number ⅓ times the ordinary count number are transmitted from the latch circuit 5 to the computer.

When a high-level signal as a driving signal is outputted from the output of 2 stage of the switch circuit 8, this driving signal is supplied to one input terminal of the corresponding AND circuit 11. And when a signal is supplied to the other input terminal, a high-level signal is outputted from the AND circuit 11 to the reset terminal. Namely, in this condition, the counter circuit 7 works as a quintan counter to output to the enable terminal 5a of the latch circuit 5 a control signal whenever time five pulses are counted. As a result, pulse signals of a count number 1/5 times the ordinary count number are transmitted from the latch circuit 5 to the computer.

Furthermore, when a high-level signal as a driving signal is outputted from the output of 3 stage of the switch circuit 8, the output of 7 stage of the counter circuit 7 is connected directly to the reset terminal of the counter circuit 7. At that time, since the driving signal is not outputted from the outputs of 1 and 2 stages of the switch circuit 8, the counter circuit 7 works as a septenary counter to output to the enable terminal 5a of the latch circuit 5 a control whenever time seven pulses are counted. As a result, pulse signals of a count number 1/7 times the ordinary count number are transmitted from the latch circuit 5 to the computer.

The indicator circuit 9 controls the lighting of indicators (e.g., LED lamp) 12 to indicate whether the mouse 1 is now outputting to the computer pulse signals of any count number of 1/1 to 1/7 based on a driving signal supplied from each output of the switch circuit 8 in parallel to the operation of the counter circuit 7. These indicators 12 are arranged on the adaptor 4 in a line aligned with the push-button switch 8a.

By operating the switch 8a while watching this display, the operator can freely vary the count number of pulse signals transmitted from the mouse to the computer. Further, if there is any restriction to the place where the mouse 1 is to be moved, or if general works such as selecting many procedure items in clerical procedures are to be done, setting is conducted so as to output a high count number 1/1 (or ⅓) such that the quantity of pulses is sensible to the movement of the mouse 1. Therefore it is possible to conduct the works rapidly by moving the cursor at high speed. If a delicate movement of the cursor is necessary such as for a graphic, setting is conducted so as to output a low count number 1/5 or 1/7 such that the quantity of pulses is slow to the movement of the mouse 1. Therefore it is possible to describe a delicate and sophisticated picture with accuracy.

In the foregoing embodiment, since the count number of pulse signals transmitted from the mouse 1 to the computer can be varied in several stages depending on the type of procedure to be done by the operator and also on the space for movement of the mouse 1, it is possible to minimize the operator's labor so that the operator can conduct the work efficiently.

Figure 4:
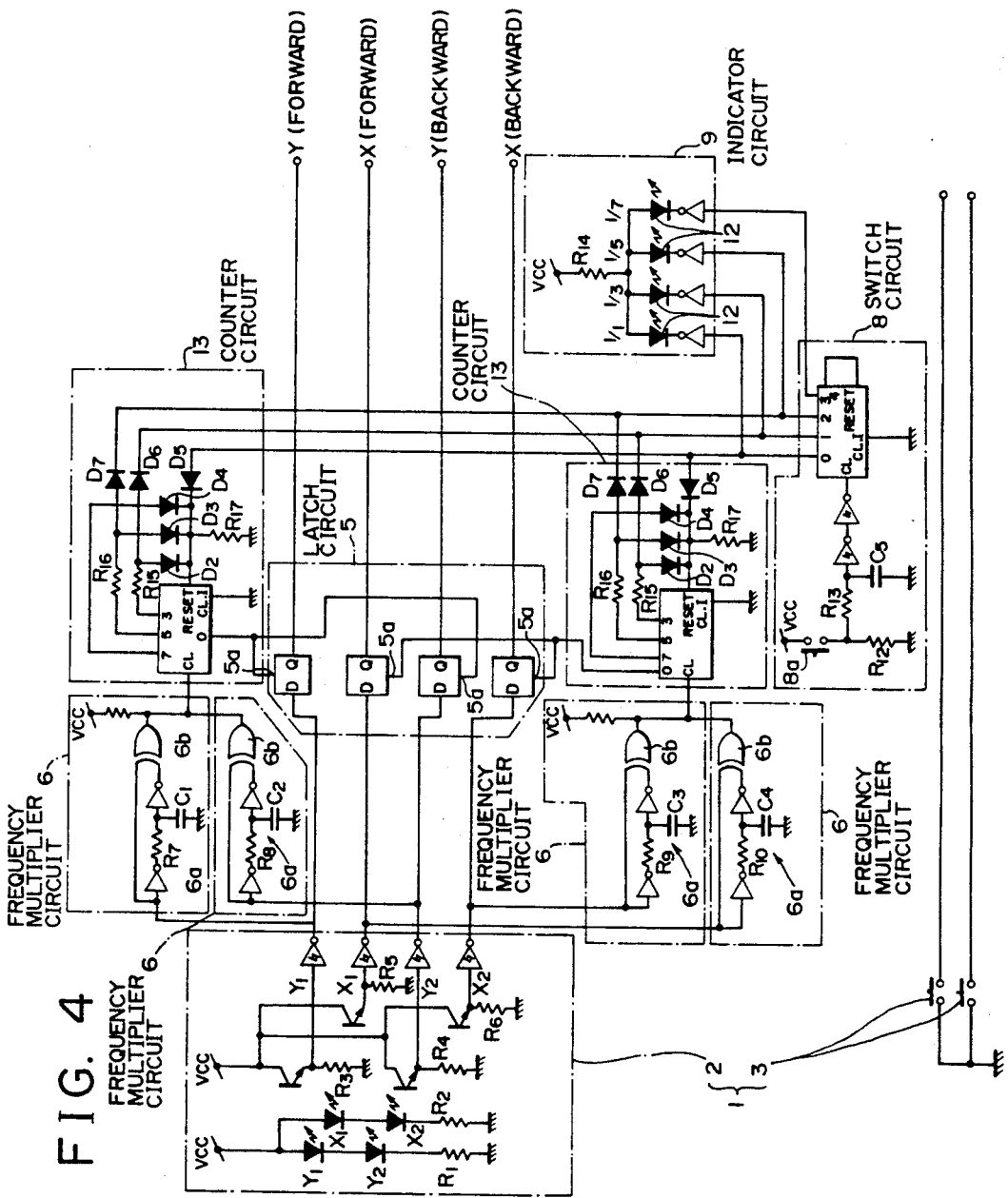
FIG. 4 is a circuit diagram similar to FIG. 1, showing a modified input unit according to another embodiment.

FIGS. 4 and 5 show an input unit according to another embodiment of this invention. Like reference numerals designate similar parts throughout the foregoing and this first embodiments; the description of the parts similar to those of the foregoing embodiment is omitted here for clarity.

The input unit of this embodiment is identical in construction with that of the foregoing embodiment, except the counter circuits and that the count number converting means as a main part of the input unit is built in the mouse 1.

Namely, this input unit is integrated on a semiconductor IC chip and is built in the mouse 1; a pushbutton switch 8a is mounted on the mouse 1, projecting centrally from the mouse body, and four indicators 12 are arranged on the mouse body in a straight line aligned with the switch 8a.

Each counter circuit 13 in this input unit includes an eight-stage counter for counting pulse signals supplied from the individual frequency multiplier 6, based on a driving signal from the switch circuit 8. The counter circuit 13 is connected at the output of 0 stage to the enable terminal 5a of the latch circuit. The outputs of 3, 5 and 7 stages are connected to the reset terminal via the respective diodes $D_2$, $D_3$ and $D_4$; resistors $R_{15}$ and $R_{16}$ are connected to 3 and 5 stages, respectively, to increase the impedances. Further, the outputs of 0, 1 and 2 stages of the switch circuit 8 are connected to the reset terminal, 3 stage and 5 stage via diodes $D_5$, $D_6$ and $D^7$, respectively.

Thus, when a high-level signal as a driving signal is outputted from the output of 0 stage of the switch circuit 8, the latch circuit 5 allows 100% of pulse signals from the signal generator circuit 2 to pass the outputs them so that the high-level signal (VCC) is supplied to the reset terminal of the counter circuit 13. When a high-level signal as a driving signal is outputted from the output of 1 stage of the switch circuit 8, the output of 3 stage of the counter circuit 13 muted with the output of 1 stage which is at low level is released, and the counter circuit 13 thereby works as a three-stage counter so that the latch circuit 5 allows only ⅓ of the pulse signals from the signal generator circuit 2 to pass and outputs them. Further, when a high-level signal as a driving signal is outputted from the output of 2 stage of the switch circuit 8, the output of 5 stage of the counter circuit 13 with the output of 2 stage which is at low level is released, and the counter circuit 13 thereby works as a five-stage counter so that the latch circuit 5 allows only 1/5 of pulse signals from the signal generator circuit 2 to pass and outputs them. Still further, when a high-level signal as a driving signal is outputted from the output of 3 stage of the switch circuit 8, the output of 0 stage of the switch circuit 8 becomes low level to release the reset of the counter circuit 13, at which time the outputs of 1 and 2 also become low level so that the outputs of 3 and 5 stages of the counter circuit 13 are muted. Meanwhile, since the output of 7 stage is connected directly to the reset, the counter circuit 13 works as a seven-stage counter so that the latch circuit 5 allows only 1/7 of pulse signals from the signal generator circuit 2 to pass and outputs them.

With this input unit using the counter circuits 13, it is possible to minimize the size of the entire circuit, compared to the foregoing input unit adapted to be connected to the mouse by the adaptor 4, and such small-sized circuit can be compactly built in the mouse 1, using the limited spaced of the mouse effectively.

Further, partly since the entire input unit is built in the mouse 1, and partly since the push-button switch 8a conducting the switching of count numbers and the indicators are mounted on the mouse body, it is possible to control the count number of pulse signals transmitted from the mouse 1 to the computer, simply by operating the switch 8a at hand. Also an improved working efficiency can be achieved.

In the illustrated embodiments, the switching of count number of the pulse signals is variable at four stages of 0 to 1/7; alternatively, it may be switched at an increased number of stages to improve the resolution, thus enabling a more delicate switching.

If an interface IC such as MSX is connected to the input unit, the input unit can be used for a variety of kinds of computers.

The count number of pulse signal outputted from the mouse may be varied stepwise by circuits other than used in the illustrated embodiments; for example, several D-type flip-flops may be combined.

According to the input unit, for computer, of this invention, the count number of pulse signals outputted from the mouse according to the mouse's movement can be varied stepwise to cause the computer to execute a desired command. For this reason, when general works such as selecting many procedure items in clerical works are to be done or when there is a restriction to the place to move the mouse, setting is conducted so as to output a high count number such that the quantity of pulses is sensible to the movement of the mouse. So it is possible to conduct works rapidly by moving the cursor at high speed. When delicate movements of the cursor are necessary such as for a graphic, a sophisticated and fine picture can be described accurately by setting to a low count number such that the quantity of pulses is slow to the mouse's movement. Thus the count number of pulse signals can be freely varied depending on the type of work to be done by the operator and on the space for the mouse to move.

Especially, if a count number converting means is built in the mouse, it is possible to simplify the entire arrangement and thus to improve the operativity. If a push-button to set the stage of count number and an indicating means to indicate the stage are provided on the mouse, an increased operativity can be achieved.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An input unit disposed between a mouse and a computer, said mouse being adapted to output a predetermined count number of pulse signals according to an amount of movement of the mouse, said input unit comprising, count number converting means for varying the count number of pulse signals outputted from the mouse and for outputting the varied count number to the computer, said converting means including a latch circuit for converting the pulse signals from the mouse to a predetermined count number and for outputting the predetermined count number to the computer; a switch circuit for setting the count number of pulse signals to be outputted to the computer; and a count circuit for counting the pulse signals from the mouse based on a driving signal from said switch circuit and for providing a control signal to said latch circuit to very the count number of pulse signals to be outputted to the computer.

2. An input unit according to claim 1, further including:

a push-button switch disposed in said switch circuit for gradually setting the count number of pulse signals to be outputted to the computer; and an indicating means for indicating, based on the driving signal from said switch circuit, the step of the count number set by said push-button switch.

3. An input unit for inputting pulse signals to a computer, comprising:

a mouse for outputting a predetermined count number of pulse signals according to an amount of movement of said mouse; and a count number converting means for varying the count number of pulse signals outputted from said mouse and for outputting the varied count number to the computer, said converting means including a latch circuit for converting the pulse signals from the mouse to a predetermined count number and for outputting the predetermined count number to the computer; a switch circuit for setting the count number of pulse signals to be outputted to the computer; and a counter circuit for counting the pulse signals from the mouse based on a driving signal from said switch circuit and for providing a control signal to said latch circuit to vary the count number of pulse signals to be outputted to the computer.

4. An input unit according to claim 3, further including:

a push-button switch disposed in said switch circuit for gradually setting the count number of pulse signals to be outputted to the computer; and an indicating means for indicating, based on the driving signal from said switch circuit, the step of the count number set by said push-button switch.

* * * * *